Figure 1:
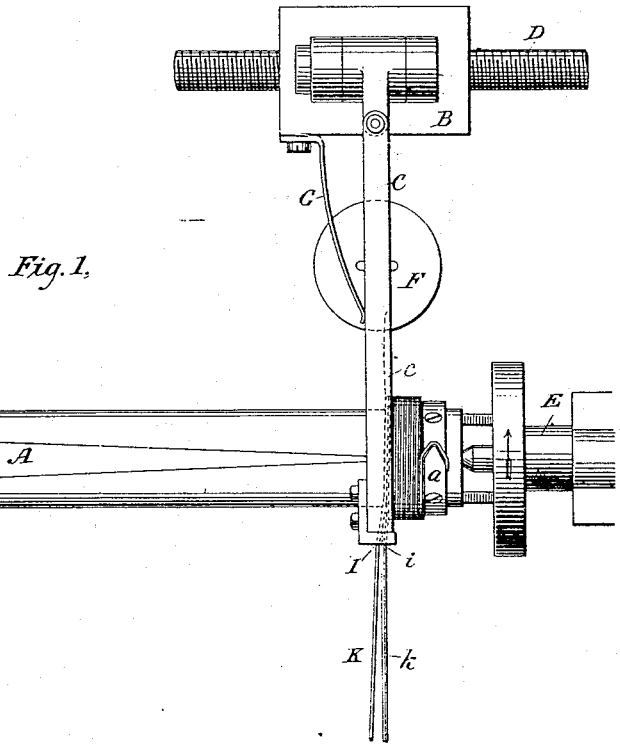

BEST AVAILABLE COPY.

(No Model.) 4 Sheets—Sheet 1.

C. G. CURTIS, S. S. WHEELER & F. B. CROCKER.
ARMATURE AND PROCESS OF AND APPARATUS FOR FORMING THE SAME.

No. 359,205. Patented Mar. 8, 1887.

Witnesses
Geo. W. Breck
Chas. J. Maguire

Inventors
Chas. G. Curtis
Schuyler S. Wheeler
Francis B. Crocker (No Model.) 4 Sheets—Sheet 2.
C. G. CURTIS, S. S. WHEELER & F. B. CROCKER.
ARMATURE AND PROCESS OF AND APPARATUS FOR FORMING THE SAME.
No. 359,205. Patented Mar. 8, 1887.
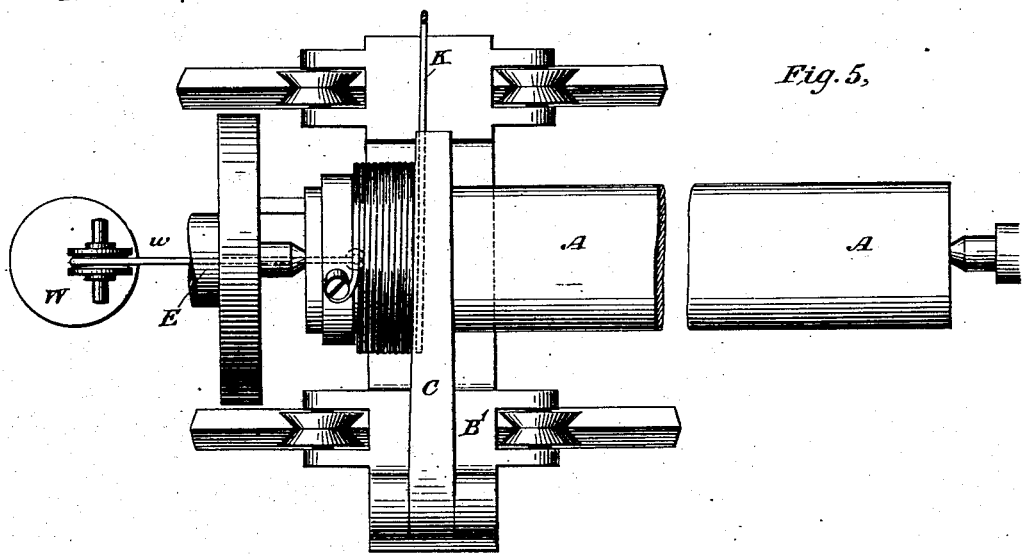
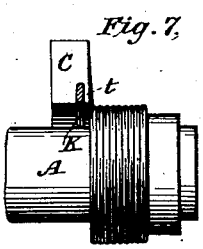
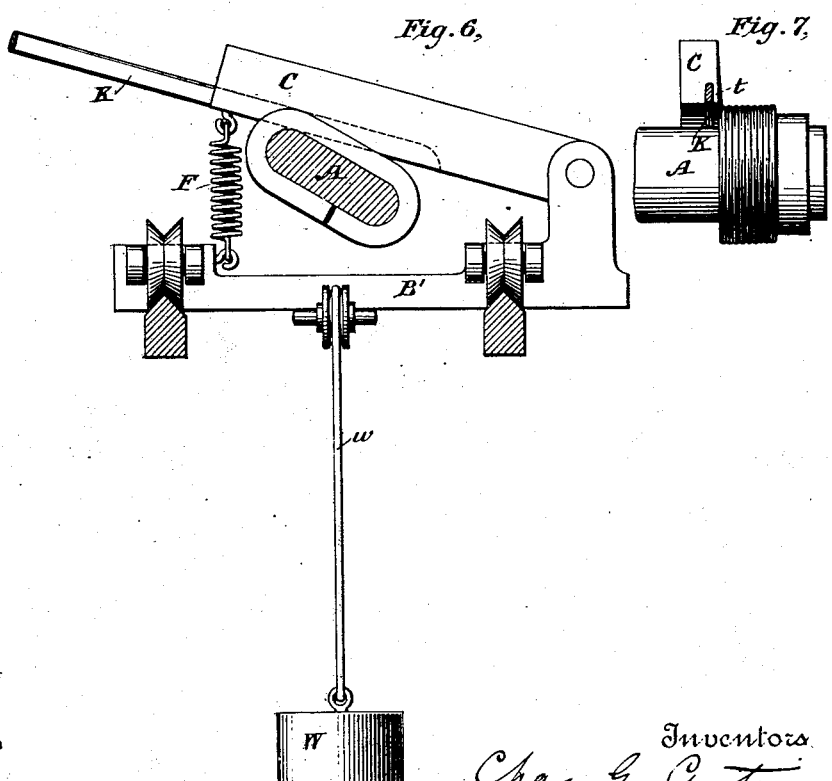
Witnesses
Geo. W. Breck.
Chas. J. Maguire
Inventors
Chas. G. Curtis
Schuyler S. Wheeler
Francis B. Crocker (No Model.) 4 Sheets—Sheet 3.
C. G. CURTIS, S. S. WHEELER & F. B. CROCKER.
ARMATURE AND PROCESS OF AND APPARATUS FOR FORMING THE SAME.
No. 359,205. Patented Mar. 8, 1887.

Witnesses
Geo. W. Breck.
Chas. J. Maguire.

Inventors
Chas. G. Curtis
Schuyler S. Wheeler
Francis B. Crocker (No Model.) 4 Sheets—Sheet 4.
C. G. CURTIS, S. S. WHEELER & F. B. CROCKER.
ARMATURE AND PROCESS OF AND APPARATUS FOR FORMING THE SAME.
No. 359,205. Patented Mar. 8, 1887.
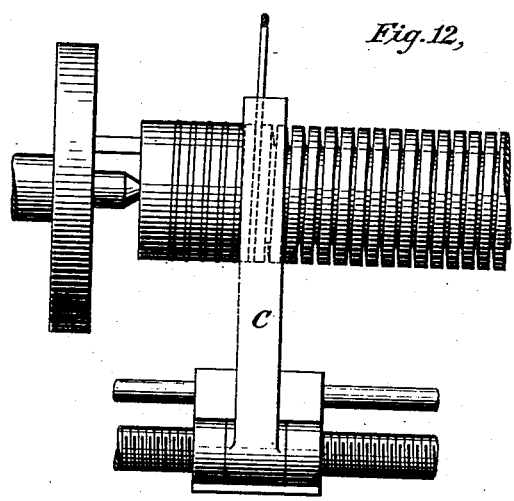
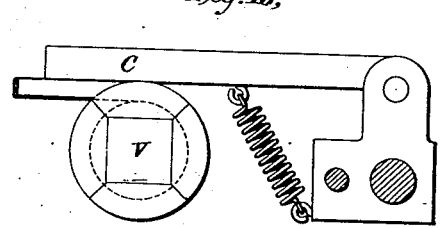
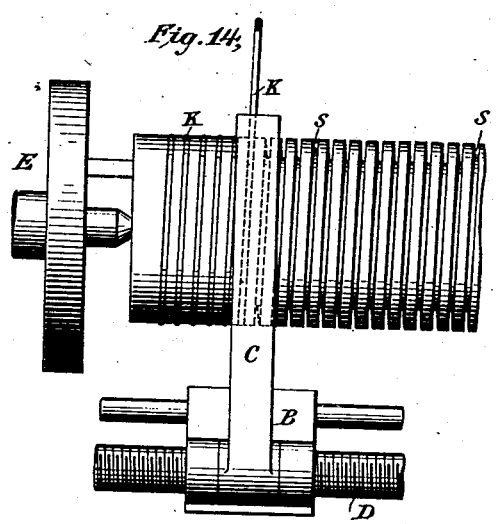
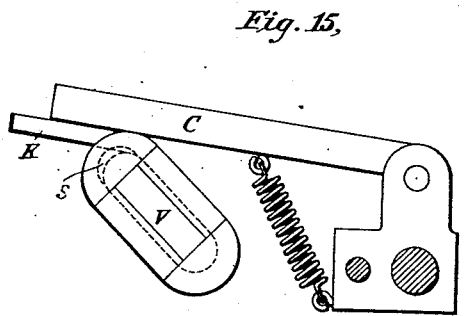
Witnesses
Geo. W. Breck.
Chas. J. Maguire.
Inventors
Chas. G. Curtis
Schuyler S. Wheeler
Francis B. Crocker

UNITED STATES PATENT OFFICE.

CHARLES G. CURTIS, SCHUYLER S. WHEELER, AND FRANCIS B. CROCKER, OF NEW YORK, N. Y., ASSIGNORS TO THE C. & C. ELECTRIC MOTOR COMPANY.

ARMATURE AND PROCESS OF AND APPARATUS FOR FORMING THE SAME.

SPECIFICATION forming part of Letters Patent No. 359,205, dated March 8, 1887.

Application filed July 2, 1886. Serial No. 206,907. (No model.)

*To all whom it may concern:*

Be it known that we, CHARLES G. CURTIS, SCHUYLER S. WHEELER, and FRANCIS B. CROCKER, of the city, county, and State of New York, have invented a new and useful Armature and Process of Winding or Forming Armatures for Dynamo-Electric Machines and Electric Motors, of which the following is a specification.

Heretofore the ordinary way of winding armatures has been to build up or form the iron core in the desired way, and after preparing it to receive the winding by covering the iron with some insulating material the insulated wire which forms the winding is wound directly upon the core itself by hand. The process of winding the wire in the case of Siemens armatures is a very long and difficult one, because the winding necessarily becomes very irregular, and it is also very difficult and expensive in the case of Gramme rings, because the end of the wire or the reel from which the wire is taken has to be passed through the ring once for every convolution wound.

In an application filed by said Curtis and Crocker in the Patent Office on the 4th day of March, 1886, Serial No. 194,020, we have described an armature-winding consisting of a flat copper wire, ribbon, or strip wound on edge upon the iron core, so that its width or greater dimension stands radial to the core. By means of this form of winding we are enabled to construct an armature having a given resistance which is composed of a very much greater number of turns than would otherwise be the case, and which is formed of only a single layer of winding.

Our present invention can be applied to any kind of wire-winding; but it is especially applicable to this form of winding, and enables us to produce such armatures as well as other forms of winding with great rapidity and at an enormously-reduced cost, and it also enables us to form windings composed of a very much thinner ribbon or of wires of other shape which could not be done in any other way.

Our invention consists in forming the winding or conducting part of the armature by winding the copper wire, ribbon, or conductor upon a mandrel or form of a proper shape, and then removing the continuous spiral or winding so formed from the form and transferring it to the iron core, which has previously been prepared to receive it.

Several different ways of carrying on our process are illustrated in the accompanying drawings.

Figure 4:
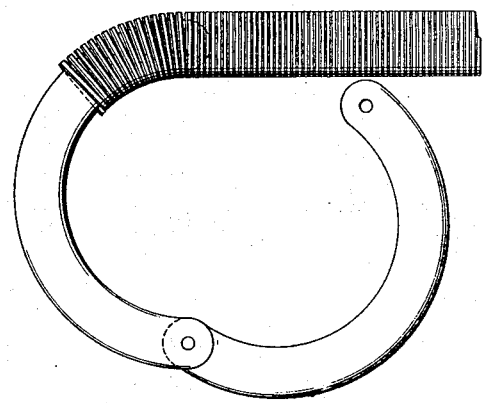
Figure 2:
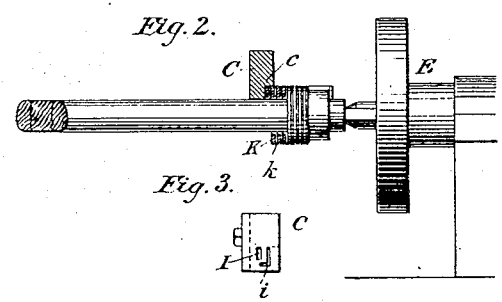
Figure 3:
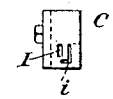
Figure 8:
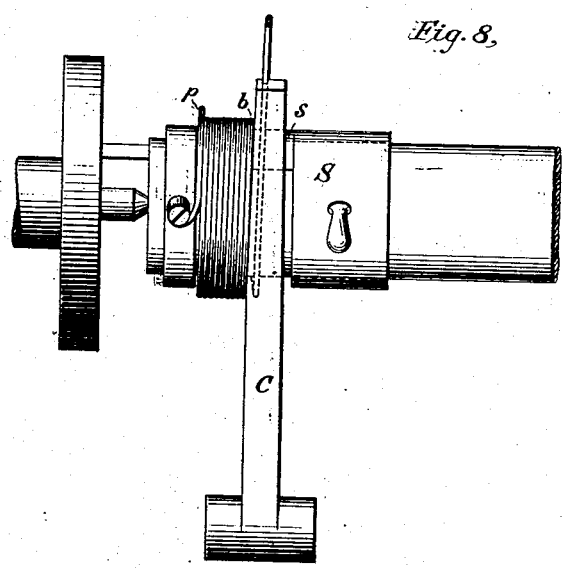
Figure 10:
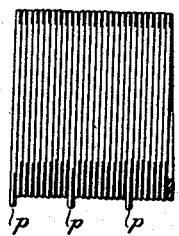
Figure 11:
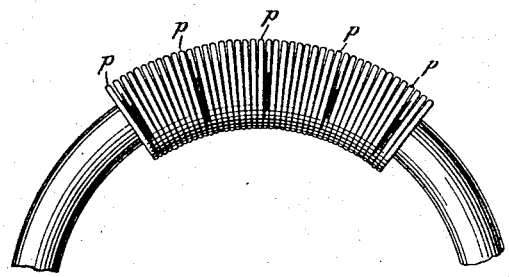

Figure 1 is a top view showing one form of machine for winding the copper wire or ribbon upon a mandrel according to our invention. Fig. 2 is a horizontal projection of the same, showing the winding-arm in section. Fig. 3 is the corresponding view of the wire guide or eye on the end of the arm. Fig. 4 is a view of the armature-core prepared to receive the winding and showing the winding partly slipped on or transferred to the core. Fig. 5 is a top view of another form of winding-machine, showing another method of winding the wire upon the mandrel. Fig. 6 is an end, and Fig. 7 a side view of the same. Fig. 8 is a top view, and Fig. 9 an end view, of the same form of winding-machine, showing our method of producing a raised or projecting convolution at every commutator section. Fig. 10 shows our winding formed with such projecting convolutions, which has been removed from the mandrel. Fig. 11 is an end view showing a portion of the winding transferred to the core. Figs. 12 and 13 are top and end views with still another form of winding-machine in which a round mandrel is employed. Figs. 14 and 15 show the same form of machine employing a flat mandrel.

We shall first describe the winding apparatus shown in Figs. 1, 2, and 3 of the drawings, A represents a form or mandrel of the proper shape—that is, having the same shape and cross-section as that of the iron ring which forms the armature-core, or the same shape as that of the winding itself when the winding is in place upon the core. This form of mandrel is mounted in a winding apparatus—such as the head and tail spindles of a lathe—so that it can be revolved on its axis at the desired rate. One end of the mandrel has attached to it a collar, *a*, which forms a shoulder, against which the wire begins to wind, and acts as a clamp to hold the end of the wire. The machine is also provided with a slide or carriage, B, upon which is mounted a vertically-pivoted arm, C, and which is moved along parallel to the mandrel at the proper rate, like an ordinary slide-rest, by the feed-screw D, which is properly geared to the head-spindle E. The arm C extends across and rests upon the mandrel A, being pressed downward by the weight F, suspended from the arm, and being pressed sidewise against the convolutions of wire that are already wound by the spring G. Where the arm projects across the mandrel it is grooved out to form a shoulder, c, against which the wire rests while the arm is bending it to conform to the mandrel, the wire being fed into this groove through an eye, I, in a suitable guide on the free end of the arm.

In using an ordinary insulated or naked wire or a flat wire or ribbon wound on edge, as the drawings show, the operation of this machine is as follows: The end of the wire K is passed through the eye I into the groove under the shoulder c, and attached to the mandrel close up to the collar a in any convenient way, such as by hooking it in a slot in the collar a. The downward pressure of the arm C is then adjusted so as to be sufficient to bend the wire to the shape of the mandrel, and the tension of the spring G is adjusted so as to cause the arm to press sidewise against the flat ribbon with sufficient force to compel it to remain in an upright position. The mandrel A is then set turning in the direction indicated by the arrow, and the wire is wound on by the arm C, which rises and falls as the flat mandrel turns, and is fed along so as to exactly keep pace with the winding; or, in other words, so as to keep the arm C at a fixed inclination to the mandrel, which inclination should be slightly greater than the pitch of the spiral winding, in order to avoid the risk of having the wire climb upon the convolution previously wound. The winding goes on automatically in this way until a sufficient number of convolutions have been completed to form a portion of or the entire armature-winding, as the case may be, or a long enough mandrel may be used to hold enough winding for a number of armatures, which would enable several windings to be made in one operation in one piece, and cut up in the desired length afterward. The wire is then cut off and the mandrel removed from the winding-machine, after which the winding is withdrawn from the mandrel. As the wire winds on, it hugs the mandrel tightly. This can best be accomplished by using a sectional or split mandrel, such as that shown in the drawings, which is provided with a tapering core or center, which may readily be forced or knocked out from one end, so as to allow the mandrel to collapse, and be easily withdrawn from the winding. This winding is then transferred or slipped onto the core or iron ring, which, if necessary, has been coated with or incased in a suitable insulating material or covering, and which is formed of two jointed halves, so that the ring can be opened and the winding slipped on, as we have shown in Fig. 4. After the winding has been slipped on, the ring is closed by bringing the two parts of the ring together, and locking or connecting them by a pin passed through the rings alternately, or in any other desirable way. The ends of the winding where they meet can then be soldered or connected together, thus forming a complete Gramme ring, which can be mounted upon a shaft and provided with a commutator, like the machine described in the application filed by us, before referred to, or in other desired ways. As we have already stated, the winding of the entire ring may either be composed of one piece and slipped over the complete ring at once, as we have indicated in Fig. 4, or it may be made in two halves and slipped over the two halves of the ring separately, and the half-rings then brought together, or it may be made in a greater number of parts or sections, if desirable.

The winding may be formed of either a naked or an insulated wire or ribbon insulated in any desired way; but if a naked wire be used, it will be necessary to insulate it after it is formed into the desired shape, or else provide some other means for preventing the convolutions from touching and short-circuiting each other. We have devised two different ways of accomplishing this. One is to take the naked winding or spiral as it comes off the mandrel and spread or stretch it so that the convolutions stand apart, and then coat it with some insulating material—such as shellac, for example—by dipping it in a bath of liquid shellac or other material, and, if desirable, afterward applying some insulating-powder or solid material before the shellac is dry, so as to form a coating, which will not melt by a moderate amount of heating, such as the armature winding is liable to, and become squeezed out, and allow the convolutions to come together. If the winding be simply dipped in shellac, a hard coating may readily be obtained by baking the winding after dipping it. The other way of preventing the convolutions from touching each other in cases where naked wire is used is to wind in an insulating sheet or tape between the successive convolutions of the winding. This may be done at the same time that the wire is being wound upon the mandrel, as we have shown in Figs. 1, 2, 3, and 4. A thin tape, k, is led into the arm at the same time as the wire K, through an angle slot, i, so as to surround the wire on two sides, as seen in Fig. 2. One edge of the tape lies between the wire and the convolution last wound, and the other edge lies between the wire and the mandrel, thus holding the convolutions apart, and at the same time forming an insulation on the inside of the winding, which, when the winding is slipped onto the core, prevents the naked wire from coming in contact with the iron.

Figs. 5, 6, and 7 show another form of winding-machine and a modification of our process of winding. In this case A represents the mandrel mounted so that it can be made to revolve as before; but the arm C, instead of being mounted on a screw-feed slide B, is mounted on a traveling carriage, B', which moves on suitable guides or rails parallel with the axis of the mandrel, being forced along against a constant pressure by the wire itself pressing sidewise upon the arm as it winds upon the mandrel. This pressure in the machine shown is obtained by weight W, attached to a cord, w, passing over a pulley, as shown. In this machine the arm itself, instead of being simply channeled out on the side next to the winding, so as to form a shoulder, which presses the wire sidewise against the preceding convolution, is slotted, as clearly shown in Fig. 7, so as to form a groove of the same cross-section as the wire strip or ribbon, leaving a thin tongue or partition, t, between the wire as it winds and the preceding convolution, against which the arm is constantly pressed by the action of the weight W. The slot in the arm C thus forms a shoulder on each side of the flat wire, which holds the wire upright and compels it to remain in that position while winding, so that it is impossible for the wire to twist or lie down on the mandrel. As the wire winds upon the mandrel the tongue t intervenes between it and the preceding convolution, and consequently there is a space between the convolution last formed and the preceding convolution equal to the thickness of the tongue. If the side pressure of the arm C be made very slight, or be taken away entirely, there will be a space between all the convolutions equal to the thickness of the tongue, and the convolutions may be brought closer together when the winding is finished or after it has been removed from the mandrel; but they can be wound close together upon the mandrel by adjusting the weight W so that the side pressure of the tongue t on the convolution previously wound is sufficient to push the wire up against the preceding convolution. As the wire is fed to the machine it passes through the arm C onto the inside of the tongue t; but as it comes round again on the mandrel it passes on the outside of the tongue t, which then becomes a shoulder and shoves the wire along the mandrel and into contact with the preceding convolution. Of course the slot in the arm may be given any desired shape to receive whatever shaped wire is used, and the tongue or partition t may be made of any desired thickness.

In the machine shown in Figs. 5 and 6 the arm C is made to press transversely upon the mandrel with a sufficient force to bend the wire by the spring F, which is adjusted to the proper tension, and which of course may be used instead of a weight for this purpose. In this machine, as in the one previously described, the edge of the arm or tongue t where it bears sidewise against the wire should evidently stand at an inclination to the mandrel slightly greater than the inclination or pitch of the wire, as shown in Fig. 5, so that the arm will not climb up on the convolutions already wound.

Figure 9:
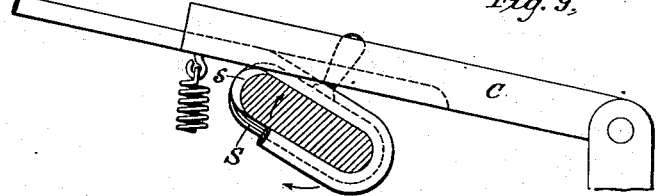

In Figs. 8 and 9 we have shown an improved attachment to the machine shown in Figs. 5, 6, and 7, and a process of winding by which an armature winding is produced according to our invention, having certain of its convolutions raised or projecting or wound differently from the rest at the points where the connections are to be made to the commutator-strips, so that the commutator-connections can be very easily and reliably made. In the machine and process shown in Figs. 8 and 9 we accomplish this by means of a finger or lump, s, which is caused to be inserted under the wire at the moment the arm is forming the particular convolution to which the commutator-strip is to connect, so that this particular convolution, instead of touching the mandrel, is wound on top of the finger or shoulder, and consequently is raised and projects beyond the other convolutions an amount equal to the thickness of the finger or lump s. This finger we attach to a slide or sleeve, S, which is mounted so as to be capable of sliding lengthwise on the mandrel, and is provided with suitable means of shifting it lengthwise at the proper times. We have shown the finger s made in the form of a crescent, the outside surface or face of which, upon which the wire winds, being semicircular in cross-section, exactly like the edge of the mandrel, in which case a projecting convolution would be formed semicircular in shape, corresponding exactly in shape with the other convolutions; but of course the finger s may be given any desired shape and thickness, so as to produce a projecting convolution of any desired shape. The manner of using this machine is as follows: The winding is begun, and after a certain number of ordinary convolutions have been wound upon the mandrel, and while the mandrel is turning, the sleeve S is slid so as to bring the finger s, resting against the last wound convolution, r, and under the arm C. This is done immediately before the mandrel reaches the position shown in Fig. 9, or, in fact, any time before the wire begins to wind over the edge of the mandrel on which the finger is. As the mandrel continues turning, carrying of course with it the finger s, the wire winds on top of the finger, and conforms to its shape, so that this convolution is raised and projects beyond the others, corresponding in shape to the shape of the form. After the mandrel has made one further complete turn, so as to bring the arm C parallel with the flat side of the mandrel and resting against the straight part of the convolution last wound, or, in other words, so that the mandrel has not quite reached the position shown in Fig. 9, the finger s is quickly withdrawn from under the arm, so that the convolution then being formed, which is the next one to the raised convolution just before wound, is wound directly on the mandrel itself, and consequently is not raised. The winding then goes on, the finger *s* being kept out of the way until enough more convolutions have been formed to complete another section, when the finger *s* is again inserted at the proper instant, and the next convolution winds on top of the finger, and consequently forms a projecting convolution at the proper point in the winding to make connection with the corresponding commutator strip. When the mandrel comes round to the proper point again, the finger *s* is again withdrawn, and then the ordinary winding goes on again until another section is completed, when the operation of inserting and withdrawing the finger is again repeated, and so on until a sufficient number of sections have been wound. The winding is then removed from the mandrel and is ready to be applied to the commutator. In this way a winding is formed, having projecting convolutions *p p p* on the end, as seen in Fig. 10, which shows a portion of the winding at right angles to its longer dimension, and as shown also in Fig. 11, which is an end view of a portion of the armature, the position of the projecting convolutions being indicated in Fig. 11 by the shadows cast by them upon the adjacent convolutions. Of course in the process of winding, the raised convolution may be made to project any desired amount, and the projecting part may be given any desired shape by properly shaping the finger or portion *s*, and the number and positions of these projecting convolutions may of course be made to correspond with the commutator by properly regulating the number of convolutions which intervene between the consecutive projecting convolutions.

In Figs. 12, 13, 14, and 15 we have shown another machine and mode of forming the armature winding according to our invention. Figs. 12 and 13 show a machine in which a round or cylindrical mandrel is employed. In this machine the mandrel is formed with a spiral slot or groove cut in its surface of exactly the same width and depth as the wire, and the wire is wound on by an arm, C, the under face of which presses the wire into the spiral slot as the mandrel revolves, the arm being fed along at the proper rate by a screw-feed, as shown, or in any other desired way. With this form of mandrel the wire is rigidly supported in the mandrel itself on both sides throughout its entire length, so that it is impossible for the wire to fall over or wind improperly, however thin or wide a ribbon be employed. When the mandrel has been wound full, it may be withdrawn from the winding by screwing it out of the winding, or by using a sectional mandrel, which can be made to collapse by knocking out a center piece or core, V, like that shown in Fig. 13.

Figs. 14 and 15 show the same machine and method, a flat mandrel being employed in this case, the mandrel being sectionally built up, so that it can collapse, as shown in Fig. 15, for example, so that by knocking out the core V, which should be made tapering, the other parts of the mandrel can be brought together and slipped out of the winding.

In order to produce a winding with high or projecting convolutions, like that shown in Figs. 8, 9, 10, and 11, for example, we form the spiral groove in the mandrel with raised portions *s s* at the proper points on the edge of the mandrel, so that the wire winds on top of these lumps, and consequently forms raised or projecting convolutions at these points in the winding.

Our invention may evidently also be applied to the winding or forming of armatures in which the winding is composed of more than one layer, like that described in our application before referred to, by winding the several layers of each section at a time upon the mandrel, and then passing to and winding the adjoining section in the same way, the sections being wound continuously upon the mandrel, so that the wire from one leads directly to the next section without a break, and, if desirable, the wire may be wound so as to project beyond the other convolutions at the junction, so as to enable the connections to be easily made to the commutator. When the desired number of sections have been wound upon the mandrel, the winding is then removed from the mandrel and transferred to the armature-core, as in the case of a winding composed of only one layer.

We are aware that in English Patent No. 3,880 of 1881 there is described a method of forming the armature wire or conductor into the required form to be applied to the armature-core; but this is essentially different from our invention, because in that method the wire or conductor is formed or reduced to the required shape of the winding by a combination of alternately-acting rolls, which compress and practically forge the wire differently at different points, and by so forging it distends one part more than another to make it take a curved form, which method can only be employed, if at all, where a flat wire winding is used, and cannot be used to produce a winding composed of a number of layers, besides which this method necessarily involves reducing the thickness or cross section of the copper conductor at its bends, so as to be less than its cross-section at other points, and the method is a very difficult one to carry on properly, the softness of the copper conductor affecting the result, so that the ends cannot be of uniform size and shape, whereas in our process we form the complete winding or series of sections by bending instead of forging the wire without changing materially the cross-sectional form, and produce coils of uniform shape and dimensions to form the several sections successively of a continuous wire to fit the armature-core or a section thereof, after which the continuous winding so formed is put upon this armature-core, and constitutes the connected continuous sections. This mode of bending or forming the winding not only enables us to form the entire winding very much more rapidly and easily than can be done in any other way, but it enables us to use a wire or conductor of any desired cross-section or shape, and it enables us to wind on any desired number of superposed layers, the same continuous wire leading directly from one armature-section to the next without necessitating specially connecting the adjacent ends of separate wires constituting the separate sections, as has always had to be done heretofore. Our invention consists, therefore, in bending the wire into the desired shape of the coils in contradistinction to forging the wire, and thus causing the wire to approximate the desired form, and in afterward applying the windings to the armature-core.

What we claim as our invention, and desire to secure by Letters Patent, is—

1. The herein-described improvement in the art of making armatures for dynamo-electric machines or motors, consisting in winding a flexible coil of continuous wire sufficient in length to constitute two or more connected armature-sections by bending the wire in contradistinction to forging the same, and then transferring said flexible coil to the armature-core, substantially as described.

2. The herein-described improvement in the art of making armatures for dynamo-electric machines and motors, consisting in making a continuous flexible coil of wire of practically uniform cross-section, adapted to bend to accommodate itself to the armature-core, and then transferring it to and securing it on the latter, substantially as described.

3. The herein-described improvement in the art of making armatures for dynamo-electric machines or electric motors, consisting in bending, in contradistinction to forging, a continuous wire or conductor into a continuous flexible coil to constitute a series of armature-sections, and then putting the same upon the armature-core and connecting each section with part of the commutator, substantially as described.

4. The herein-described improvement in the art of making armatures for dynamo-electric machines or electric motors, consisting in winding a continuous wire or conductor so as to form an entire flexible armature-winding by bending the wire in contradistinction to forging the same, and then putting the winding so formed on to the armature-core, substantially as described.

5. The herein-described improvement in the art of making armatures for dynamo-electric machines or electric motors, consisting in winding a coil of flat wire or conductor on edge to form a continuous flexible coil by bending the wire in contradistinction to forging the same, and then applying said coil to the armature-core, substantially as described.

6. The herein-described improvement in the art of forming armatures for dynamo-electric machines or electric motors, consisting in winding two or more armature-sections of a continuous wire or conductor with one of the turns or convolutions of each armature-section projecting beyond the others, then applying the coil so formed to the armature-core, and connecting the respective commutator-strips to the said projecting convolutions, substantially as described.

7. The herein-described armature having two or more of its sections wound with a continuous wire or conductor, one of the convolutions of each section or the convolution at the junction of each two sections being formed so as to project beyond the adjoining convolutions, and being connected with the corresponding commutator-strip.

8. The herein-described armature having a winding formed of a continuous flat wire, ribbon, or conductor on edge, the winding being divided into sections by convolutions which project beyond the others, and are connected with the corresponding commutator-strips.

9. The combination, with the revolving flat mandrel A, of the arm C, which bears upon the outside of the wire and bends it to conform to the shape of the mandrel, substantially as described.

10. The combination, with the revolving mandrel A, of the arm or stationary guide C, formed with a slot or groove in which the wire is bent to conform to the mandrel, and at the same time supported on both sides, so as to keep it upright, substantially as described.

11. The combination, with the revolving mandrel A and means for winding the wire or conductor thereon, of the fingers s, adapted to be introduced under the wire as it winds upon the mandrel, substantially as described.

12. The combination, with the revolving mandrel A and means for winding the wire or conductor thereon, of the sleeve S, sliding upon the mandrel, and the finger s, attached to the sleeve, substantially as described.

13. The combination, with the revolving mandrel A, of the traveling carriage B', and the arm C, pivoted to the carriage, which bears upon the outside of the wire and bends it to conform to the shape of the mandrel, substantially as described.

14. The combination, with the revolving mandrel A, of the traveling carriage B' and the arm C, pivoted thereon and formed with a groove or slot on its surface where it bears upon the mandrel, through which slot the wire is fed and wound upon the mandrel, substantially as described.

CHAS. G. CURTIS.
SCHUYLER S. WHEELER.
FRANCIS B. CROCKER.

Witnesses:
WILLIAM A. DREYER,
C. S. BRADLEY.